(12) United States Patent
Mills

(10) Patent No.: US 9,378,086 B2
(45) Date of Patent: Jun. 28, 2016

(54) METHODS AND APPARATUS FOR IMPROVED DMX512 COMMUNICATION

(71) Applicant: KONINKLIJKE PHILIPS N.V., Eindhoven (NL)

(72) Inventor: John Brean Mills, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 258 days.

(21) Appl. No.: 14/350,420

(22) PCT Filed: Oct. 8, 2012

(86) PCT No.: PCT/IB2012/055423
§ 371 (c)(1),
(2) Date: Apr. 8, 2014

(87) PCT Pub. No.: WO2013/054247
PCT Pub. Date: Apr. 18, 2013

(65) Prior Publication Data
US 2014/0245112 A1   Aug. 28, 2014

Related U.S. Application Data

(60) Provisional application No. 61/545,810, filed on Oct. 11, 2011.

(51) Int. Cl.
*H03M 13/00* (2006.01)
*G06F 11/10* (2006.01)
*H05B 37/02* (2006.01)

(52) U.S. Cl.
CPC ............ *G06F 11/10* (2013.01); *H05B 37/0254* (2013.01)

(58) Field of Classification Search
CPC .. G06F 11/10; G06F 11/1004; H05B 37/0254
USPC ......................................................... 714/751
See application file for complete search history.

(56) References Cited

U.S. PATENT DOCUMENTS 6,761,470 B2 * 7/2004 Sid ..................... H05B 37/0272
                                                        315/312
7,501,571 B2   3/2009 Forsman et al.
(Continued)

FOREIGN PATENT DOCUMENTS

WO   2007121569 A1   11/2007
WO   2009087537 A2   7/2009

OTHER PUBLICATIONS

Standard, BSR E1.11, Entertainment Technology—USITT DMX512 Asynchronous Serial Digital Data Transmission Standard for Controlling Lighting Equipment and Accessories, Chapter 7 on SIP, 1999. pp. 1-79, Apr. 20, 2011. www.blue-room.org.uk.

(Continued)

*Primary Examiner* — David Ton
(74) *Attorney, Agent, or Firm* — Meenakshy Chakravorty

(57) ABSTRACT

Disclosed are methods and apparatus for improved DMX communications. In some embodiments, methods and apparatus related to extensions of the DMX protocol enable error detection and correction by enhanced DMX slave devices. The methods and apparatus may utilize at least one forward error correction byte that is incorporated within a DMX packet and that may be utilized to correct instruction bytes in the DMX packet. A plurality of bytes within the DMX packet may optionally be interleaved according to an interleaving scheme in some variations.

21 Claims, 6 Drawing Sheets

(56) References Cited

U.S. PATENT DOCUMENTS

| | | |
|---|---|---|
| 2007/0258523 A1 | 11/2007 | You et al. |
| 2007/0297354 A1 | 12/2007 | Ishiyama et al. |
| 2008/0136334 A1* | 6/2008 | Robinson ........... H05B 37/0254 315/151 |
| 2009/0128061 A1* | 5/2009 | Dilley .................. H05B 37/029 315/317 |
| 2010/0084992 A1 | 4/2010 | Valois et al. |
| 2014/0223268 A1* | 8/2014 | Yseboodt ............ G06F 11/1004 714/807 |

OTHER PUBLICATIONS

"DMX Should Not Be Used for Pyro/Laser Split From USB to DMX Converter Thread", Blue Room Technical Forum, Posted May 24, 2006.

\* cited by examiner

METHODS AND APPARATUS FOR IMPROVED DMX512 COMMUNICATION

TECHNICAL FIELD

The present invention is directed generally to methods and apparatus related to extensions of a communication protocol. More particularly, various inventive methods and apparatus disclosed herein relate to methods and apparatus related to extensions of the DMX communication protocol.

BACKGROUND

The DMX communication protocol is a lighting command protocol conventionally employed in the lighting industry for some programmable lighting applications and currently includes the DMX512 and DMX512-A protocols. In the DMX protocol, lighting related instructions may be transmitted to a lighting unit as control data that is formatted into packets including up to 512 bytes of data, in which each data byte is constituted by 8-bits representing a digital value of between zero and 255. Each 8-bits of data are preceded by a single Start Bit and followed by two Stop Bits to form what is referred to as a data slot (size 11 bits). These 512 data slots are preceded by a "start code" byte (typically 0x00) also referred to as slot 0 which has its own Start Bit followed by 8-bits of data (typically 0x00) then two Stop Bits. The "start code" is preceded by a Break and a Mark-after-Break.

In the DMX protocol, an individual data slot of the up to 512 data slots in a given DMX packet is intended as a lighting related command for a particular lighting unit. For example, the 8-bits of data within an individual data slot may be intended as a command for a particular "channel" of a multi-channel lighting unit, wherein a digital value of zero indicates no radiant output power for a given channel of the lighting unit (i.e., channel off), and a digital value of 255 indicates full radiant output power (100% available power) for the given channel of the lighting unit (i.e., channel full on). For example, considering for the moment a three-channel lighting unit based on red, green and blue LEDs (i.e., an "R-G-B" lighting unit), a lighting command in DMX protocol may specify each of a red channel command, a green channel command, and a blue channel command as eight-bit data (i.e., a data byte) representing a value from 0 to 255. The maximum value of 255 for any one of the color channels instructs a processor of the lighting unit to control the corresponding light source(s) to operate at maximum available power (i.e., 100%) for the channel, thereby generating the maximum available radiant power for that color (such a command structure for an R-G-B lighting unit commonly is referred to as 24-bit color control). Hence, a command of the format [R, G, B]=[255, 255, 255] would cause the lighting unit to generate maximum radiant power for each of red, green and blue light (thereby creating white light). For finer resolution color control more than the 8-bits of data in a single data slot could be used, for example, sixteen bit color luminaires using two data slots so as to represent a value from 0 to 65535. Not just R-G-B lighting is considered but also larger numbers of colors such as, but not exclusively limited to, Red-Green-Blue-Amber-White.

Also, for example, all or aspects of an individual data byte may within a data slot may also be intended as a command to control one or more additional aspects of a lighting unit and/or other DMX slave device. For example, one or more data bytes may control pattern, focus, prism, pan, tilt, rotation speed, and/or animation of a lighting unit. Also, for example, one or more data bytes may control a dimming shutter, color wheel, and/or framing lens of a lighting unit. As understood by one of ordinary skill in the art, the DMX protocol may additionally or alternatively be utilized to control other aspects of one or more lighting units and/or other DMX slave devices.

Thus, a given communication link employing the DMX protocol conventionally can support up to 512 different lighting unit channels. A given lighting unit designed to receive communications formatted in the DMX protocol generally is configured to respond to only one or more particular data bytes of the 512 bytes of data in the packet corresponding to the number of channels of the lighting unit (e.g., in the example of a three-channel lighting unit, three bytes are used by the lighting unit), and ignore the other bytes, based on a particular position of the desired data byte(s) in the overall sequence of the up to 512 data bytes in the packet. To this end, DMX-based lighting units may be equipped with an address selection mechanism that may be manually set by a user/installer to determine the particular position of the data byte(s) that the lighting unit responds to in a given DMX packet. Other systems may make use of the bi-directional communications capabilities provided for in the ANSI E1.20-2006, Entertainment Technology—RDM—Remote Device Management over DMX512 Networks standard to remotely configure DMX addresses.

Certain implementations of the DMX protocol involve use of the protocol outside of its original scope and/or the stretching of the capabilities of the protocol. For example, the DMX protocol is being utilized over a wireless network in some implementations. Also, for example, the DMX protocol is utilized to control lighting units that may put people and/or property at risk in some implementations (e.g., eye damaging laser emitting lighting units utilized around people). In such implementations, and in other implementations of the DMX protocol, it may be desirable to implement error detection and/or correction to improve reliability, functionality, and/or safety of lighting units.

The DMX512 protocol does not provide for error detection. The DMX512-A protocol mentions error detection via use of a System Information Packet (SIP). The SIP has an alternate start code (e.g., 0xCF i.e. 207) and includes checksum data relating to the previous DMX packet on the data link, along with other control information. Although the SIP implements some degree of error detection, utilization thereof requires all DMX slave devices to be compatible with the DMX512-A protocol. Also, the checksum included in the SIP must be sent in a separate packet. Also, the SIP does not implement any error correction.

Thus, there is a need in the art to provide methods and apparatus related to extensions of the DMX protocol that enable error detection and correction by enhanced DMX slave devices and that optionally overcome one or more additional drawbacks of a SIP.

SUMMARY

The present disclosure is directed to inventive methods and apparatus for improved DMX communications. For example, in some embodiments methods and apparatus related to extensions of the DMX protocol enable error detection and correction by enhanced DMX slave devices while optionally maintaining compatibility with non-enhanced DMX slave devices. The methods and apparatus may utilize a plurality of forward error correction bytes that are incorporated within a DMX packet and that include forward error correction data related to a plurality of instruction bytes in the DMX packet.

A plurality of bytes within the DMX packet may optionally be interleaved according to an interleaving scheme in some variations.

Generally, in one aspect, a method of providing improved DMX communication is provided and includes the step of connecting a plurality of enhanced DMX slaves to a DMX network. The enhanced DMX slaves have a plurality of DMX slave control addresses corresponding thereto. The method also includes the step of compiling a DMX packet having a plurality of bytes. The bytes include a plurality of enhanced DMX slave instruction bytes corresponding to the enhanced DMX slave control addresses and include at least one forward error correction byte. The forward error correction byte is incorporated within the DMX packet and is a forward error correction code block of a plurality of the bytes of the DMX packet. The method also includes the steps of transmitting the DMX packet on the DMX network; receiving the DMX packet at each of the enhanced DMX slaves; buffering a plurality of the bytes including the forward error correction byte at each of the enhanced DMX slaves; and analyzing at least one of the enhanced DMX slave instruction bytes in light of the forward error correction byte at each of the enhanced DMX slaves. Each of the enhanced DMX slaves at least selectively corrects a respective at least one of the enhanced DMX slave instruction bytes utilizing the forward error correction byte when the forward error correction byte indicates an error therewith and acts upon the corrected enhanced DMX slave instruction byte.

In some embodiments, the enhanced DMX slave instruction bytes include interleaved DMX slave instruction bytes, each of the interleaved DMX slave instruction bytes having bits that correspond to operating instructions for a plurality of the enhanced DMX slaves. In some versions of those embodiments the bytes of the DMX start code further include at least one non-interleaved non-enhanced DMX slave instruction byte corresponding to a non-enhanced DMX slave control address.

In some embodiments, the method further includes the step of interleaving a plurality of individual bits among the DMX slave instruction bytes according to an interleaving scheme prior to transmitting the DMX packet on the DMX network. In some versions of those embodiments the enhanced DMX slave instruction bytes include first, second, and third enhanced DMX slave instruction bytes. Each of the first, second, and third enhanced DMX slave instruction bytes includes first enhanced DMX slave instruction bits corresponding to a first of the enhanced DMX slaves and second enhanced DMX slave instruction bits corresponding to a second of the enhanced DMX slaves. The method may further include the step of transmitting a separate informational packet to the DMX slaves. The separate informational packet includes data pertaining to processing the forward error correction byte.

In some embodiments, data pertaining to processing the forward error correction byte is preloaded onto the enhanced DMX slaves. Also, in some embodiments, the forward error correction byte is interleaved throughout the DMX packet. In some versions of those embodiments the at least one forward error correction byte contains forward error correction block data for all control instructions of the DMX packet. The method may further include the step of transmitting a go command after transmitting the DMX packet on the DMX network, wherein each of the enhanced DMX slaves do not act on the enhanced DMX slave instruction bytes of the DMX packet until the go command is transmitted.

Generally, in another aspect, a method of providing improved DMX communication includes connecting at least one enhanced DMX slave to a DMX network. The enhanced DMX slave has at least one enhanced DMX slave control address. The method also includes connecting at least one non-enhanced DMX slave to the DMX network. The non-enhanced DMX slave has at least one non-enhanced DMX slave control address. The method also includes compiling a DMX packet having a plurality of bytes. The bytes include at least one enhanced DMX slave instruction byte corresponding to the enhanced DMX slave control address, at least one non-enhanced DMX slave instruction byte corresponding to the non-enhanced DMX slave control address, and at least one forward error correction byte. The forward error correction byte is incorporated within the DMX packet and is a forward error correction code block of a plurality of the bytes of the DMX packet. The method further includes the steps of transmitting the DMX packet on the DMX network; receiving the DMX packet at the enhanced DMX slave; buffering a plurality of the bytes including the forward error correction byte at the enhanced DMX slave; and analyzing at least one of the enhanced DMX slave instruction bytes in light of the forward error correction byte at each of the enhanced DMX slaves. Each of the enhanced DMX slaves at least selectively corrects a respective at least one of the enhanced DMX slave instruction bytes utilizing the forward error correction byte when the forward error correction byte indicates an error therewith and acts upon the corrected data. The non-enhanced DMX slave acts on any received non-enhanced DMX slave instruction byte regardless of the forward error correction byte.

In some embodiments, the at least one enhanced DMX slave instruction byte includes a first enhanced DMX slave instruction byte and a second enhanced DMX slave instruction byte. In some versions of those embodiments the enhanced DMX slave only acts on the first enhanced DMX slave instruction byte when the forward error correction byte verifies or corrects the first enhanced DMX slave instruction bye but acts on the second enhanced DMX slave instruction byte even when the forward error correction byte does not verify or correct the second enhanced DMX slave instruction byte.

The method may further include interleaving a plurality of individual bits in the first enhanced DMX slave instruction byte and the second enhanced DMX slave instruction byte according to an interleaving scheme prior to transmitting the DMX packet on the DMX network. In some versions of those embodiments the method includes transmitting a manufacturer specific packet to the DMX slave that includes data pertaining to the interleaving scheme.

In some embodiments, the at least one enhanced DMX slave includes a first enhanced DMX slave and a second enhanced DMX slave. In some versions of those embodiments the at least one enhanced DMX slave instruction byte includes first, second, and third enhanced DMX slave instruction bytes and each of the first, second, and third enhanced DMX slave instruction bytes includes first enhanced DMX slave instruction bits corresponding to the first enhanced DMX slave and second enhanced DMX slave instruction bits corresponding to the second enhanced DMX slave.

Generally, in another aspect, a method of receiving and analyzing improved DMX communications includes receiving a DMX packet having a plurality of bytes. The bytes include at least one enhanced DMX slave instruction byte corresponding to an enhanced DMX slave and at least one forward error correction byte. The forward error correction byte is incorporated within the DMX packet and is a forward error correction code block of a plurality of the bytes of the DMX packet. The method further includes the steps of buffering a plurality of the bytes including the forward error correction byte; analyzing at least one of the enhanced DMX slave instruction bytes in light of the forward error correction byte at each of the enhanced DMX slaves; selectively correcting at least one of the enhanced DMX slave instruction bytes utilizing the forward error correction byte when the forward error correction byte indicates an error therewith; and at least selectively acting upon the corrected enhanced DMX slave instruction bytes.

In some embodiments, at least one enhanced DMX slave instruction byte includes an interleaved first enhanced DMX slave instruction byte and an interleaved second enhanced DMX slave instruction byte and the method further includes de-interleaving the first enhanced DMX slave instruction byte and the second enhanced DMX slave instruction byte.

Generally, in another aspect, a method of providing improved DMX communication includes compiling a DMX packet having a plurality of bytes. The bytes include at least one enhanced DMX slave instruction byte corresponding to an enhanced DMX slave control address, at least one non-enhanced DMX slave instruction byte corresponding to a non-enhanced DMX slave control address, and at least one forward error correction byte. The forward error correction byte is incorporated within the DMX packet and is a forward error correction code block of a plurality of the bytes of the DMX packet. The method further includes transmitting the DMX packet on a DMX network.

Generally, in another aspect, a method of providing improved DMX communication includes compiling a DMX packet having a plurality of bytes. The bytes include a plurality of DMX slave instruction bytes and at least one forward error correction byte. The forward error correction byte is incorporated within said DMX packet and is a forward error correction code block of a plurality of said bytes of said DMX packet. The method further includes the step of transmitting the DMX packet on a DMX network.

In some embodiments the DMX slave instruction bytes include enhanced slave instruction bytes. In some versions of those embodiments the DMX slave instruction bytes also include non-enhanced slave instruction bytes.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
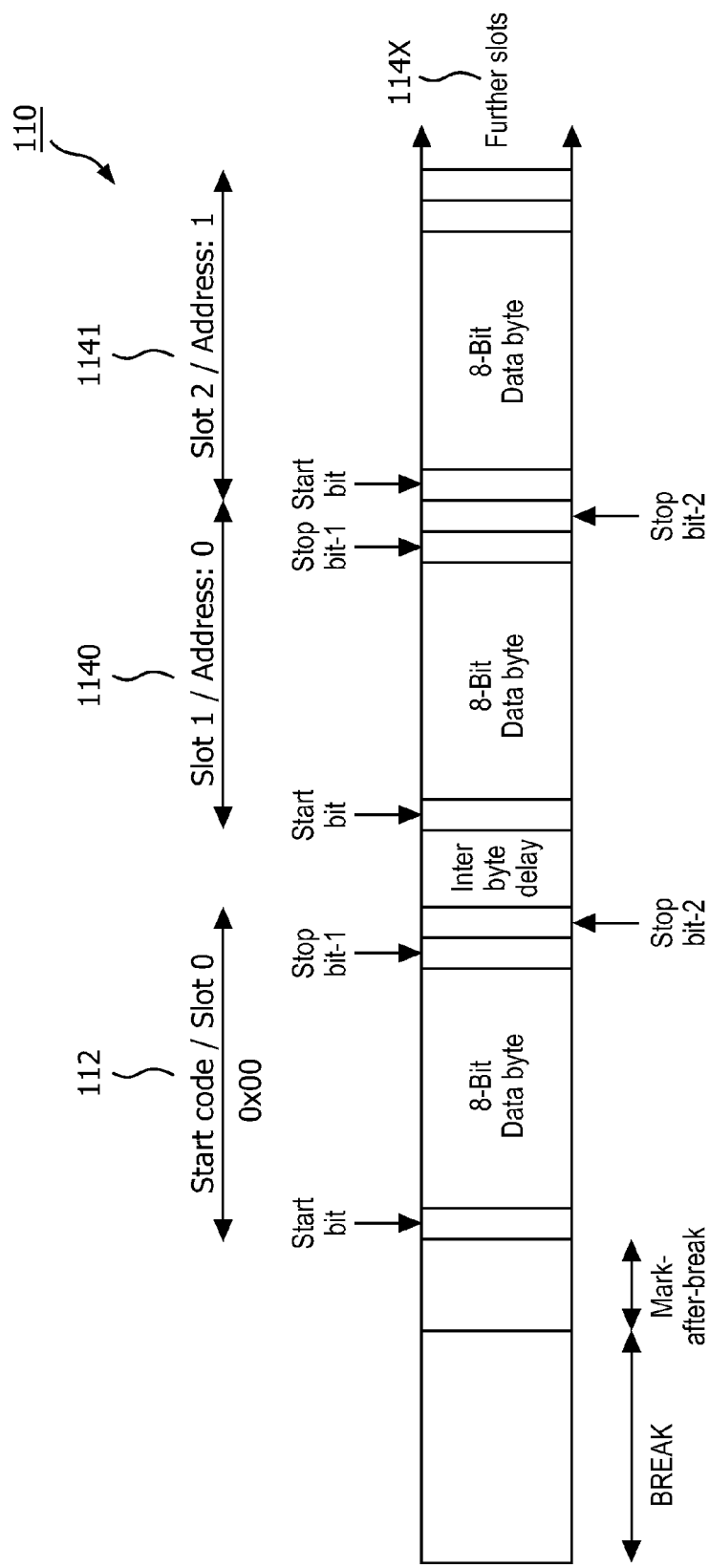
FIG. 1 illustrates beginning portions of an embodiment of a DMX packet.

The DMX512 protocol does not provide for error detection. The DMX512-A protocol mentions error detection via use of a SIP, which implements some degree of error protection, but requires all DMX slave devices to be compatible with the DMX512-A protocol and requires the sending of a separate packet. Moreover, DMX512 and DMX512-A do not provide for error correction.

Thus, there is a need in the art to provide methods and apparatus related to extensions of the DMX protocol that enable error detection and error correction by enhanced DMX slave devices. The extensions to the DMX protocol may optionally maintain full compatibility with non-enhanced DMX slave devices and optionally overcome one or more additional drawbacks of a SIP. The methods and apparatus may utilize a plurality of forward error correction bytes that are incorporated within a DMX packet and that include forward error correction data related to a plurality of bytes in the DMX packet.

More generally, Applicant has recognized and appreciated that it would be beneficial to provide extensions of the DMX communication protocol. In view of the foregoing, various embodiments and implementations of the present invention are directed to extensions of a communication protocol.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. For example, throughout the description various embodiments are discussed in combination with certain DMX controlled lighting fixtures that may be configured for certain applications. However, one of skill in the art having had the benefit of the present disclosure will recognize and appreciate that the principles hereof may be implemented in other lighting fixtures that may be configured for other applications and/or in other non-lighting DMX devices. Moreover, descriptions of well-known apparatuses and methods may be omitted so as to not obscure the description of the representative embodiments. Such methods and apparatuses are clearly within the scope of the claimed invention.

Various inventive methods and apparatus disclosed herein relate to extensions of the ANSI E1.11-2008, Entertainment Technology—USITT DMX 512-1—Asynchronous Serial Digital Data Transmission Standard for Controlling Lighting Equipment and Accessories (the DMX communication protocol). This includes all previous versions of the DMX communication protocol such as, for example, the original 1986 United States Institute for Theatre Technology standard and the revisions made in 1990 and 2004. This also includes subsequent versions of the DMX communications protocol, including reaffirmations.

Referring to FIG. 1, beginning portions of an embodiment of a DMX packet 110 are illustrated. The DMX packet 110 includes a start code 112 having a null value (0x00). The start code 112 follows a sequence formed from a "BREAK" and a "Mark-After-Break." The DMX packet 110 also includes a plurality of data slots, including first data slot 1140, second data slot 1141, and other data slots 114X. A DMX slave device that is configured for address "0" would utilize data transmitted in the first instruction data slot 1140 and a DMX slave device that is configured for address "1" would utilize data transmitted in the second instruction data slot 1141. Optionally, a single DMX slave device may utilize instruction data bytes from slots 1140 and 1141. Other instruction slots containing bytes 114X may include up to 509 additional bytes of data configured for providing instructions to one or more additional DMX slave devices and/or configured for implementing one or more forward error correction bytes as described herein.

Figure 2:
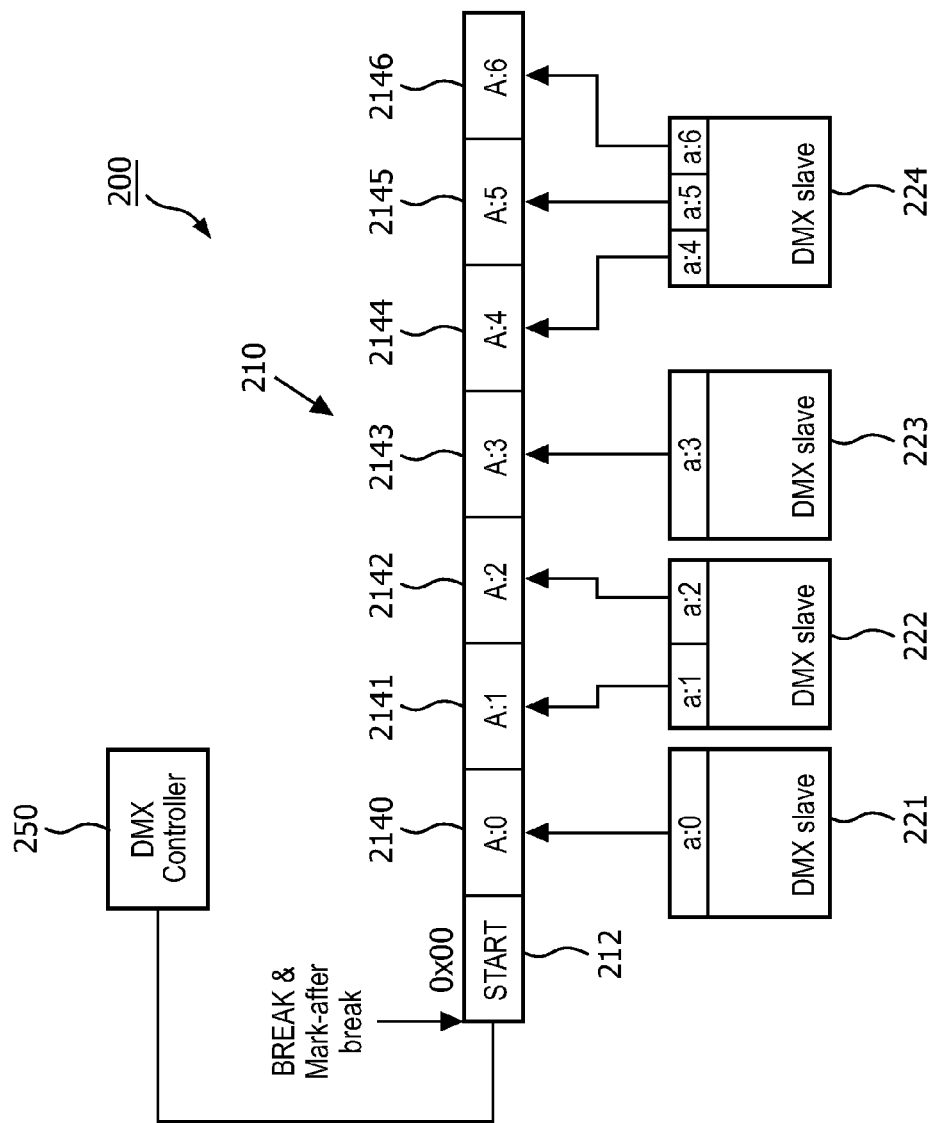
FIG. 2 illustrates an embodiment of a DMX network.

Referring to FIG. 2, an embodiment of a DMX network 200 is illustrated. The DMX network 200 includes a DMX controller 250 transmitting a DMX packet 210 to a plurality of DMX slaves 221-224. The DMX packet 210 includes a start code 212 and a plurality of data byte containing slots 2140-2146 following the start code 212. The DMX slave 221 is configured to utilize data within instruction data byte of slot 2140. DMX slave 222 is configured to utilize data within instruction data bytes of slots 2141 and 2142. DMX slave 223 is configured to utilize data within instruction data byte of slot 2143. DMX slave 224 is configured to utilize data within instruction data bytes of slots 2144, 2145, and 2146. The DMX controller 250 may optionally implement one or more additional data slots such as one or more forward error correction bytes as described herein. When one or more forward error correction bytes as described herein are implemented into the DMX packet 210 any DMX slave 221-224 that is enhanced to analyze such forward error correction bytes may do so. Even if one or more of the DMX slaves 221-224 is not enhanced, it may still function normally in some embodiments even when reading instruction bytes from a DMX packet that incorporates one or more forward error correction bytes described herein.

Figure 3:
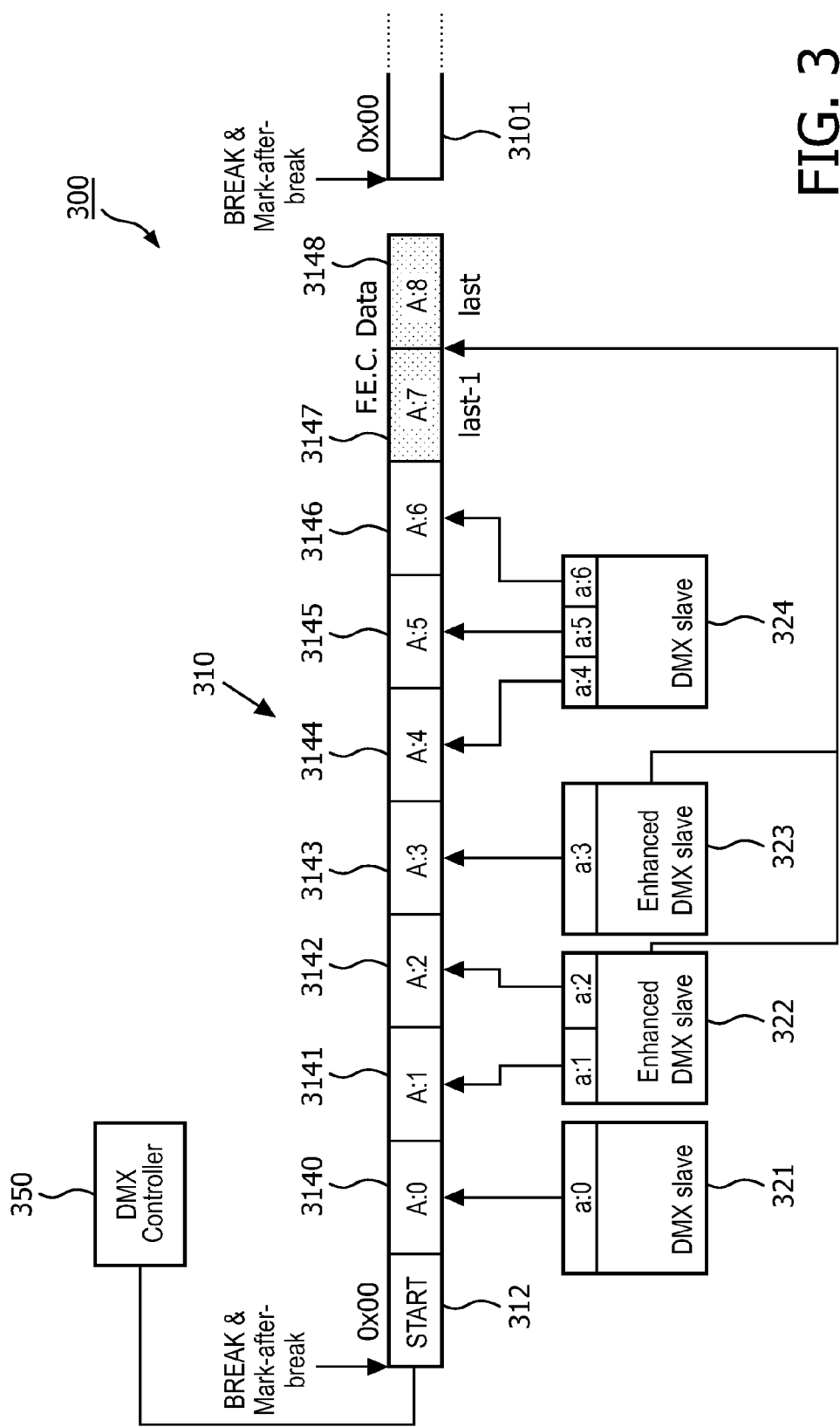
FIG. 3 illustrates an embodiment of a DMX network having enhanced DMX slaves and also having non-enhanced DMX slaves.

Referring to FIG. 3, an embodiment of a DMX network 300 having enhanced DMX slaves 322, 323 and also having non-enhanced DMX slaves 321, 324 is illustrated. The DMX network 300 includes a DMX controller 350 transmitting a DMX packet 310 to the DMX slaves 321-324. In some implementations the DMX controller 350 may transmit the DMX packet over a communication medium that is subject to noise and interference such as a power line network and/or a wireless network. The DMX packet 310 includes a start code 312 and a plurality of data byte containing slots 3140-3148 following the start code 312. The non-enhanced DMX slave 321 is configured to act upon data within data byte of slot 3140. The non-enhanced DMX slave 324 is configured to act upon data within data bytes of slots 3144-3146.

Enhanced DMX slave 322 is configured to act upon data within instruction data bytes of slots 3141 and 3142. Enhanced DMX slave 322 is also configured to buffer and analyze at least instruction data bytes of slots 3141, 3142 and buffer and analyze forward error correction bytes in slots 3147 and 3148. In one implementation the enhanced DMX slave 322 may buffer instruction data bytes in slots 3141, 3142 and compare them to one or more bits of forward error correction data bytes in slots 3147 and 3148. If the received instruction data bytes of slots 3141, 3142 correspond to the one or more bits of forward error correction data bytes of slots 3147, 3148, the DMX slave 322 may then act on the instruction data bytes of slots 3141 and 3142. If the received instruction data bytes of slots 3141, 3142 do not correspond to the received forward error correction data bytes of slots 3147, 3148, then the DMX slave 322 may not act on one or both of the instruction data bytes of slots 3141 and 3142. The DMX slave 322 may instead optionally utilize forward error correction data bytes in slots 3147, 3148 (optionally after verifying they are not corrupted) to correct the instruction data bytes in slots 3141, 3142. For example, in some embodiments the DMX slave 322 may act on the instruction data byte in slot 3141 regardless of the correspondence between the instruction data byte in slot 3141 and forward error correction data bytes in slots 3147, 3148 (for example, if forward error correction data bytes in slots 3147, 3148 indicate instruction data byte is incorrect and/or if forward error correction data bytes in slots 3147, 3148 are corrupted), but only act on the instruction data byte in slot 3142 if it is verified as being correct or may be corrected via analysis of one or more bits of forward error correction data bytes in slots 3147, 3148. For example, forward error correction data bytes in slots 3147, 3148 may be encoded utilizing Reed Solomon coding, enhanced DMX slave 322 may verify and decode forward error correction data bytes in slots 3147, 3148, and verify and optionally correct instruction data bytes in slots 3147, 3148 utilizing one or more bits of verified forward error correction bytes in slots 3147 and 3148.

The enhanced DMX slave 323 is configured to act upon data within instruction data byte in slot 3143. Enhanced DMX slave 323 is also configured to buffer and analyze at least instruction data byte in slot 3143 and buffer and analyze forward error correction bytes in slots 3147 and 3148. In some implementations the enhanced DMX slave 323 may buffer the instruction data byte in slot 3143, verify the integrity of forward error correction data bytes in slots 3147, 3148, and compare the instruction data byte in slot 3143 to forward error correction bytes in slots 3147 and 3148. The enhanced DMX slave 323 may optionally only act on the instruction data byte in slot 3143 when the forward error correction bytes in slots 3147 and 3148 indicate it is correct or when the forward error correction bytes in slots 3147 and 3148 enable correction of the instruction data byte in slot 3143 by the enhanced DMX slave 323.

A second DMX packet 3101 is also illustrated in FIG. 3 following the first DMX packet 310. The second DMX packet 3101 may have the same format as the first DMX packet 310. Moreover, the enhanced DMX slaves 322 and 323 may likewise buffer data bytes of second DMX packet 3101, compare the buffered instruction data bytes to forward error correction data bytes thereof, and verify and/or correct one or more instruction data bytes utilizing the forward error correction data bytes.

Figures 4, 5:
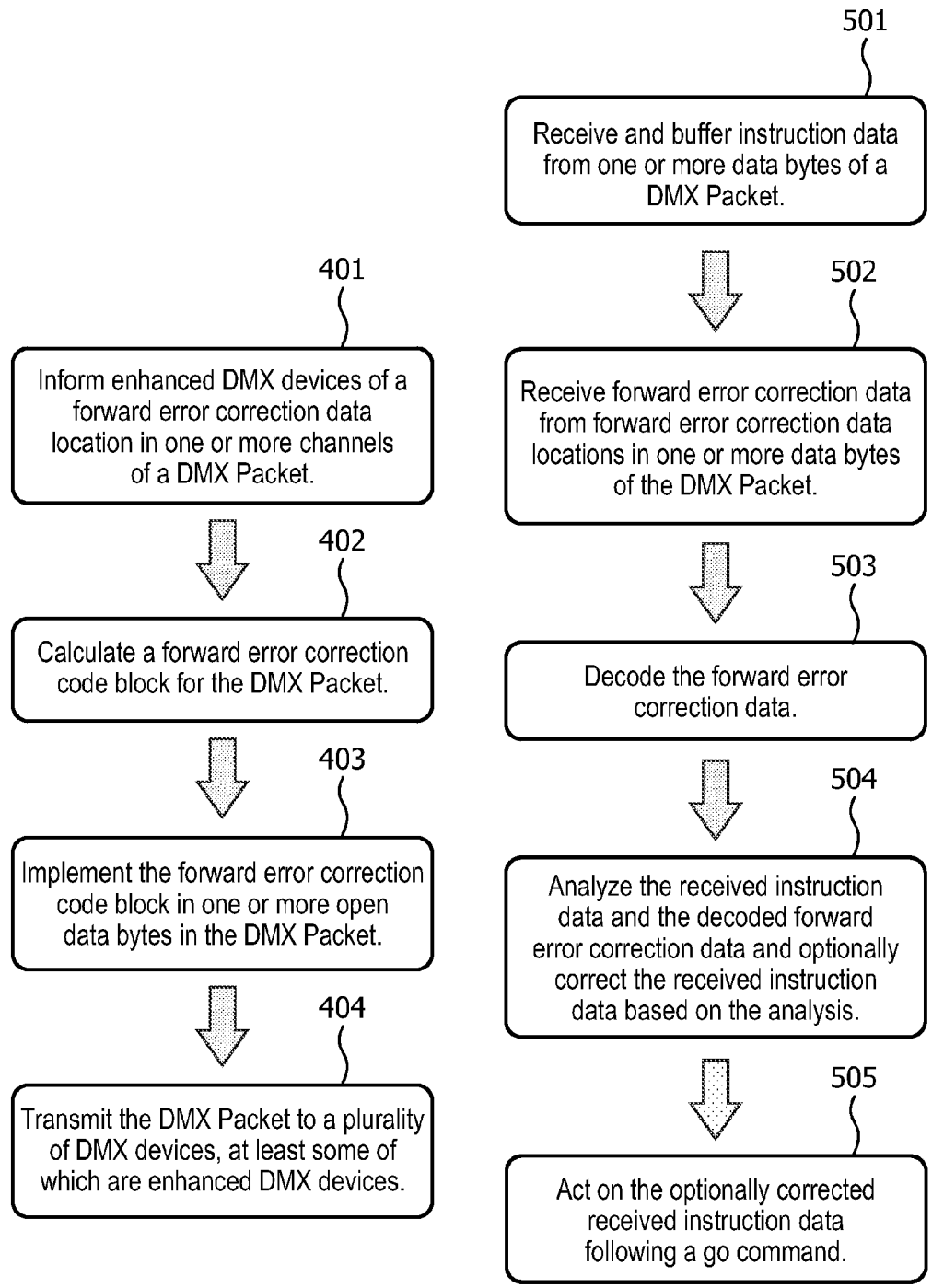
FIG. 4 illustrates an embodiment of compiling and transmitting improved DMX communications.
FIG. 5 illustrates an embodiment of receiving and analyzing improved DMX communications.

Referring to FIG. 4, an embodiment of compiling and transmitting improved DMX communications is illustrated. The steps of FIG. 4 may be implemented in, for example, the controllers 250/350 in some implementations of the DMX networks 200/300.

At step 401 enhanced DMX slave devices are informed of a forward error correction data location in one or more channels of a DMX packet. For example, the enhanced DMX slave devices may be informed that the forward error correction data location will be in the last two data slots of a DMX packet. Also, for example, the enhanced DMX slave devices may be informed that the forward error correction data location will be in one or more particular forward error correction data bytes, which may be located at the beginning, end, or middle of a DMX packet. The enhanced DMX slave devices may also optionally be informed what format the forward error correction will take (e.g., what forward error correction algorithm will be utilized). In some implementations the DMX slave devices may include preloaded data that identifies a fixed location of a forward error correction data byte within a DMX packet and/or identifies the forward error correction format. In some implementations the DMX slave devices may include a jumper or other user interface that enables a user to identify a particular location of one or more locations of a forward error correction data byte within a DMX packet and/or the forward error correction format. In some implementations a controller may send a SIP that includes data indicating where the forward error correction will reside within a DMX packet and optionally indicating what format the forward error correction will take.

At step 402 a forward error correction code block is calculated for the DMX packet. In some embodiments the forward error correction code block is calculated for all instruction data bytes of the DMX packet. In other embodiments the forward error correction code block may be calculated for less than all of the instruction data bytes of the DMX packet. In some embodiments the forward error correction algorithm may be a block code such as, for example, Reed Solomon, Goley, BCH, multidimensional parity, or other appropriate forward error correction methodology as would be known to those skilled in the art.

At step 403 the forward error correction code block is implemented in one or more open data slots in the DMX packet. The open data slots are those which the DMX slave devices have been informed carry the forward error correction code block. In some embodiments the data slots may be those at the end of the DMX start code packet.

At step 404 the DMX start code packet is transmitted to a plurality of DMX slave devices. At least some of the DMX slave devices are enhanced DMX slave devices and will verify the instruction data bytes of the transmitted DMX packet with forward error correction data bytes and optionally correct corrupted instruction data bytes based upon the forward error correction data bytes. Other of the DMX slave devices may be non-enhanced DMX slave devices and will simply ignore the transmitted forward error correction data bytes since they may be transmitted in open data slots that are not being used by the non-enhanced DMX slave devices.

Referring to FIG. 5, an embodiment of receiving and analyzing improved DMX communications data is illustrated. The steps of FIG. 5 may be implemented in, for example, the enhanced DMX slaves 322, 323 of FIG. 3 in some embodiments.

At step 501, data from one or more instruction data bytes of a DMX packet is received and buffered. For example, in some embodiments instruction data bytes of a DMX packet that are specific to a single enhanced DMX slave are received and buffered.

At step 502, a forward error correction code block is received from a forward error correction data location in one or more data slots of the DMX packet. The particular data slots that store the forward error correction code block may be dictated, for example, by preloaded data on a DMX slave, transmitted data from a DMX controller, and/or from input from a user via a user interface.

At step 503, the forward error correction code block is decoded according to a forward error correction algorithm. In some embodiments the algorithm utilized may be dictated, for example, by preloaded data on a DMX slave, transmitted data from a DMX controller, and/or input from a user via a user interface. All or portions of the forward error correction code block may also optionally be verified to ensure it has not been corrupted during transmission thereof.

At step 504 the received instruction data bytes are compared to the decoded and optionally verified forward error correction data. If the received instruction data bytes and the decoded forward error correction data do not correspond, then the received instruction data may optionally be corrected based on the forward error correction data.

At step 505 it is determined whether to act on device specific instruction bytes based upon the comparison of the device specific instruction bytes to the forward error correction data. For example, in some embodiments the device specific instruction bytes will not be acted upon unless the forward error correction data indicates the device specific instruction bytes are correct or the instruction bytes have been corrected utilizing the forward error correction data. Also, for example, in some embodiments some data bytes (or aspects thereof) will not be acted upon unless the forward error correction data indicates the device specific instruction bytes are correct or may be corrected utilizing the forward error correction data while other data bytes (or aspects thereof) will be acted upon regardless. For example, non-critical data bytes may be acted upon regardless while critical and/or potentially dangerous data bytes may not be acted upon unless the forward error correction data indicates the device specific instruction bytes are correct or may be corrected utilizing the forward error correction data. Also, for example, in some embodiments the device specific instructions will be acted upon unless two or more consecutive erroneous DMX packets have occurred within a predetermined time period.

In some embodiments, the enhanced DMX slave may not act on device specific instruction bytes until a specific go command is received over the DMX network. For example, a go command may be transmitted by a controller over the DMX network shortly after transmission of the DMX packet to provide a plurality enhanced DMX slaves sufficient time to process the data in the DMX packet. Transmission of such a go command may provide for substantially simultaneous action on instruction bytes by the plurality of enhanced DMX slaves. In some embodiments the enhanced DMX slave may additionally or alternatively not act on device specific instruction bytes until triggered by a real time clock and a go command. In yet other embodiments the enhanced DMX slave may act on device specific instruction bytes as soon as they are verified and/or corrected.

Figures 6, 7:
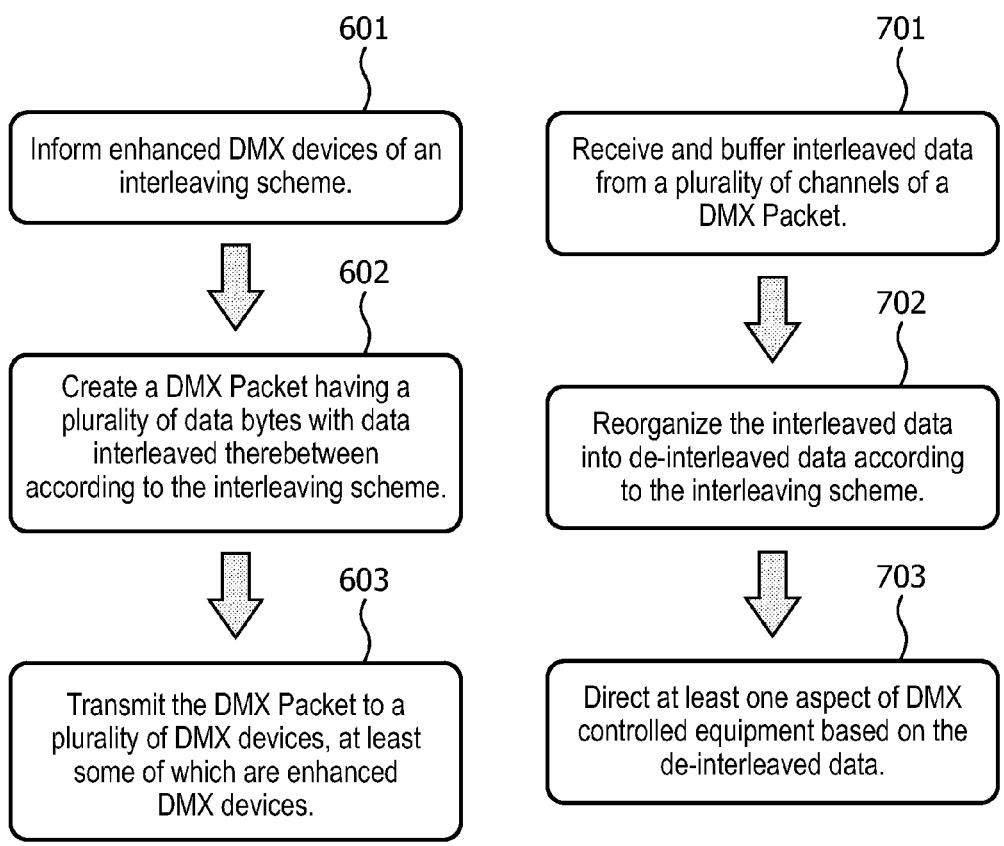
FIG. 6 illustrates an embodiment of a method of compiling and transmitting an interleaved DMX packet.
FIG. 7 illustrates an embodiment of a method of receiving and analyzing interleaved data from an interleaved DMX packet.

Referring to FIG. 6, an embodiment of a method of compiling and transmitting an interleaved DMX packet is illustrated. The method of FIG. 6 may optionally be implemented in, for example, the controllers 250/350 in some implementations of the DMX networks 200/300. The method of FIG. 6 may be implemented alone or optionally in combination with the compiling and transmission of a start code DMX packet having forward error correction data therein.

At step 601 enhanced DMX slave devices are informed of an interleaving scheme. In some implementations the enhanced DMX slave devices may include preloaded data that identifies an interleaving scheme. In some implementations the enhanced DMX slave devices may include a jumper or other user interface that enables a user to identify a particular interleaving scheme. In some implementations a controller may send a SIP that includes data indicating an interleaving scheme.

At step 602 a DMX packet is created having a plurality of data slots with data interleaved there between according to the interleaving scheme. For example, referring briefly to FIG. 3, in one embodiment the data of data slots 3144, 3145, and 3146 may be interleaved with one another. For example, each of data slots 3144, 3145, and 3146 may include individual data bits that are intended for different channels of the DMX slave 324 (instead of each of the data containing bytes in slots 3144, 3145, and 3146 including bits intended only for a single channel of the DMX slave 324). In some embodiments the interleaving may occur over data bytes that correspond to a plurality of different DMX slave devices. In other words, a single data slot may include data corresponding to a plurality of DMX slave devices. Also, the interleaving may optionally include the forward error correction data byte(s) in embodiments in which the interleaving is combined with forward error correction bytes. The interleaving should not occur among data slots that correspond to any non-enhanced DMX slaves to ensure they receive instructional data bytes as intended.

At step 603, the interleaved DMX packet is transmitted to a plurality of DMX slave devices. At least some of the DMX slave devices are enhanced DMX slave devices and will de-interleave the DMX start code packet once received. Other of the DMX slave devices may be non-enhanced DMX slave devices and will simply ignore the interleaved data since it will only be transmitted in data bytes that do not correspond to non-enhanced DMX slave devices.

Referring to FIG. 7, an embodiment of a method of receiving and analyzing interleaved data from an interleaved DMX packet is illustrated. The method of FIG. 7 may be implemented in, for example, the enhanced DMX slaves 322, 323 of FIG. 3 in some embodiments.

At step 701 interleaved data is received and buffered from a plurality of data bytes of a DMX packet. For example, the data bytes that are buffered for analyzing forward error correction data may likewise be buffered. At step 702 the interleaved data is reorganized into de-interleaved data according to the interleaving scheme. For example, individual data bits from a plurality of data bytes that correspond to a DMX slave may be reorganized into an order that corresponds to an interleaving scheme to thereby obtain de-interleaved instructions for the DMX slave. The individual data bits may also optionally be de-interleaved to obtain forward error correction data bytes if the DMX start code packet includes forward error correction data and that forward error correction data has been interleaved. At step 703 at least one aspect of the DMX controlled equipment corresponding to the DMX slave is directed based on the de-interleaved data.

In embodiments where interleaving is combined with a forward error correction byte incorporated in the DMX packet, it may help minimize the impact of errors in the transmitted DMX packet when DMX slave devices determine it is appropriate to utilize one or more instruction data bytes despite the forward error correction data being corrupted and/or incapable of correcting instruction data byte errors (e.g., if the one or more instruction data bytes are not critical, if the difference between received instruction data bytes and the forward error correction data bytes indicates minimal corruption, if the erroneous DMX packet has not been preceded by additional erroneous packets within a set time period). Also, interleaving the forward error correction data block may help minimize the impact of any transmission errors in the transmitted forward error correction data. For example, interleaving the forward error correction data block may enable error correction based on non-corrupted forward error correction data bytes even though other forward error correction data bytes may be corrupted.

Figure 8:
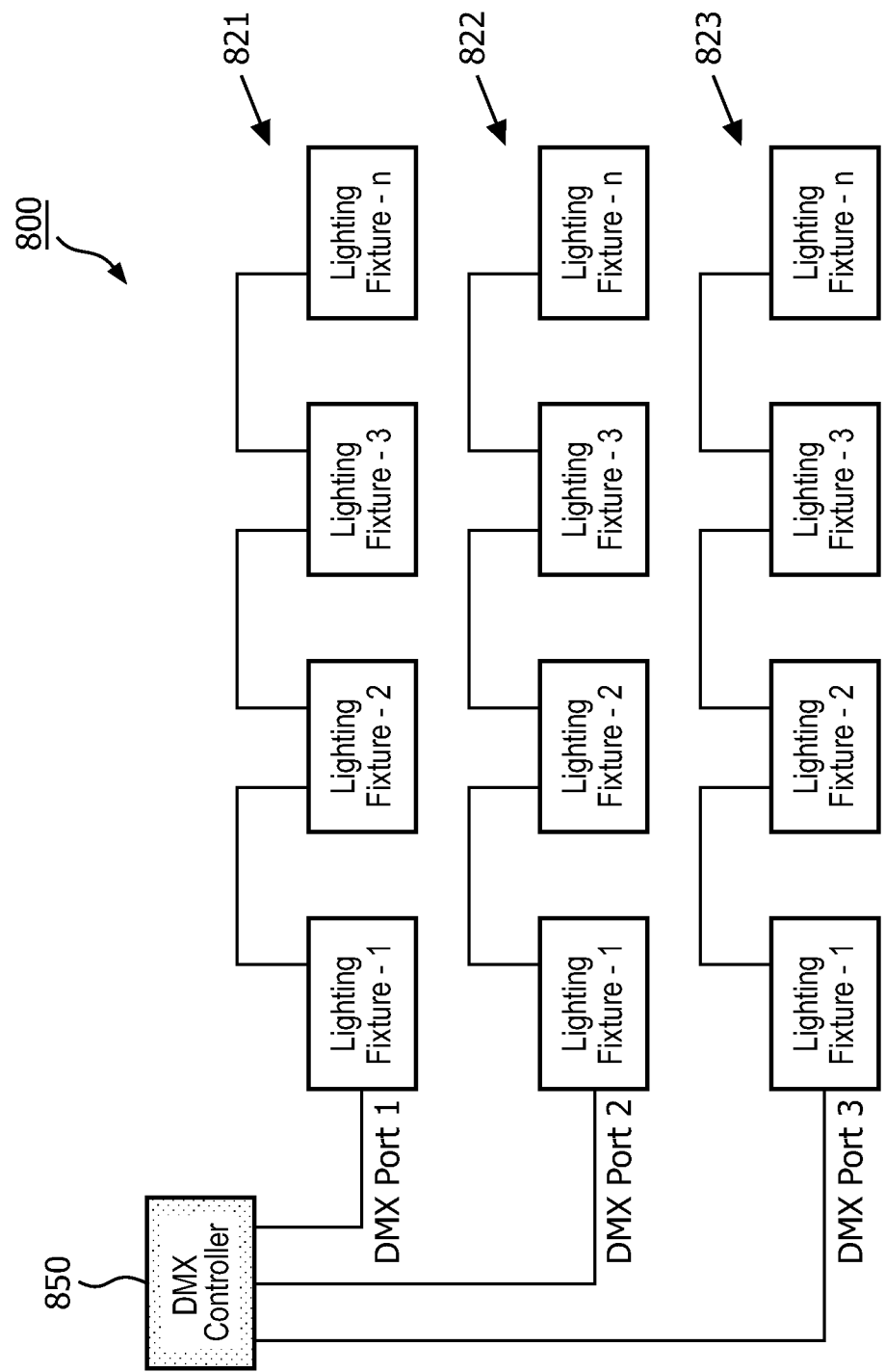
FIG. 8 illustrates another embodiment of a DMX lighting network.

FIG. 8 illustrates another embodiment of a DMX lighting network 800. The DMX lighting network 800 includes a DMX controller 850 controlling three separate groupings of DMX slave lighting fixtures 821, 822, and 823. The DMX controller 850 may send the same DMX packet to all three groupings 821, 822, and 823 or may transmit separate DMX packets to one or more of the groupings 821-823. For example, the DMX controller may transmit standard DMX512 packets to groupings 821, DMX communications implementing a forward error correction byte in the DMX packet to grouping 822, and DMX communications implementing interleaving in the DMX packet (optionally in combination with the forward error correction byte) to groupings 823.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing in the claims in parentheses are provided merely for convenience and should not be construed as limiting the claims in any way.

In the claims, as well as in the specification above, all transitional phrases such as "comprising," "including," "having," "containing," "involving," "holding," and the like are to be understood to be open-ended, i.e., to mean including but not limited to, as set forth in the United States Patent Office Manual of Patent Examining Procedures, Section 2111.03.

What is claimed is:

1. A method of providing improved DMX communication, comprising:

connecting a plurality of enhanced DMX slaves to a DMX network, said enhanced DMX slaves having a plurality of DMX slave control addresses corresponding thereto;

compiling a DMX packet having a plurality of bytes, said bytes including a plurality of enhanced DMX slave instruction bytes corresponding to said enhanced DMX slave control addresses and including at least one forward error correction byte;

wherein said forward error correction byte is incorporated within said DMX packet and is a forward error correction code block of a plurality of said bytes of said DMX packet;

transmitting said DMX packet on said DMX network;

receiving said DMX packet at each of said enhanced DMX slaves;

buffering a plurality of said bytes including said forward error correction byte at each of said enhanced DMX slaves;

analyzing at least one of said enhanced DMX slave instruction bytes in light of said forward error correction byte at each of said enhanced DMX slaves;

wherein each of said enhanced DMX slaves at least selectively corrects a respective at least one of said enhanced DMX slave instruction bytes utilizing said forward error correction byte when said forward error correction byte indicates an error therewith and acts upon said corrected enhanced DMX slave instruction byte.

2. The method of claim 1, wherein said enhanced DMX slave instruction bytes include interleaved DMX slave instruction bytes, each of said interleaved DMX slave instruction bytes having bits that correspond to operating instructions for a plurality of said enhanced DMX slaves.

3. The method of claim 2, wherein said bytes of said DMX packet further include at least one non-interleaved non-enhanced DMX slave instruction byte corresponding to a non-enhanced DMX slave control address.

4. The method of claim 1, further comprising interleaving a plurality of individual bits among said DMX slave instruction bytes according to an interleaving scheme prior to transmitting said DMX packet on said DMX network.

5. The method of claim 4, wherein said enhanced DMX slave instruction bytes include first, second, and third enhanced DMX slave instruction bytes, wherein each of said first, second, and third enhanced DMX slave instruction bytes includes first enhanced DMX slave instruction bits corresponding to a first of said enhanced DMX slaves and second enhanced DMX slave instruction bits corresponding to a second of said enhanced DMX slaves.

6. The method of claim 1, further comprising transmitting a separate informational packet to said DMX slaves, said separate informational packet including data pertaining to processing said forward error correction byte.

7. The method of claim 4, wherein data pertaining to processing said forward error correction byte is preloaded onto said enhanced DMX slaves.

8. The method of claim 1, wherein said forward error correction byte is interleaved throughout said DMX packet.

9. The method of claim 8, wherein said at least one forward error correction byte contains forward error correction block data for all control instructions of said DMX packet.

10. The method of claim 9, further comprising transmitting a go command after transmitting said DMX packet on said DMX network, wherein each of said enhanced DMX slaves do not act on said enhanced DMX slave instruction bytes of said DMX packet until said go command is transmitted.

11. A method of providing improved DMX communication, comprising:

connecting at least one enhanced DMX slave to a DMX network, said enhanced DMX slave having at least one enhanced DMX slave control address;

connecting at least one non-enhanced DMX slave to said DMX network, said non-enhanced DMX slave having at least one non-enhanced DMX slave control address;

compiling a DMX packet having a plurality of bytes, said bytes including at least one enhanced DMX slave instruction byte corresponding to said enhanced DMX slave control address, at least one non-enhanced DMX slave instruction byte corresponding to said non-enhanced DMX slave control address, and at least one forward error correction byte;

wherein said forward error correction byte is incorporated within said DMX packet and is a forward error correction code block of a plurality of said bytes of said DMX packet;

transmitting said DMX packet on said DMX network;

receiving said DMX packet at said enhanced DMX slave;

buffering a plurality of said bytes including said forward error correction byte at said enhanced DMX slave;

analyzing at least one of said enhanced DMX slave instruction bytes in light of said forward error correction byte at each of said enhanced DMX slaves;

wherein each of said enhanced DMX slaves at least selectively corrects a respective at least one of said enhanced DMX slave instruction bytes utilizing said forward error correction byte when said forward error correction byte indicates an error therewith and acts upon said corrected data; and wherein said non-enhanced DMX slave acts on any received said non-enhanced DMX slave instruction byte regardless of said forward error correction byte.

12. The method of claim 11, wherein said at least one enhanced DMX slave instruction byte includes a first enhanced DMX slave instruction byte and a second enhanced DMX slave instruction byte.

13. The method of claim 12, wherein said enhanced DMX slave only acts on said first enhanced DMX slave instruction byte when said forward error correction byte verifies or corrects said first enhanced DMX slave instruction bye but acts on said second enhanced DMX slave instruction byte even when said forward error correction byte does not verify or correct said second enhanced DMX slave instruction byte.

14. The method of claim 13, further comprising interleaving a plurality of individual bits in said first enhanced DMX slave instruction byte and said second enhanced DMX slave instruction byte according to an interleaving scheme prior to transmitting said DMX packet on said DMX network.

15. The method of claim 14, further comprising transmitting a manufacturer specific packet to said DMX slave that includes data pertaining to said interleaving scheme.

16. The method of claim 11, wherein said at least one enhanced DMX slave includes a first enhanced DMX slave and a second enhanced DMX slave.

17. The method of claim 16, wherein said at least one enhanced DMX slave instruction byte includes first, second, and third enhanced DMX slave instruction bytes, wherein each of said first, second, and third enhanced DMX slave instruction bytes includes first enhanced DMX slave instruction bits corresponding to said first enhanced DMX slave and second enhanced DMX slave instruction bits corresponding to said second enhanced DMX slave.

18. A method of receiving and analyzing improved DMX communications, comprising:

receiving a DMX packet having a plurality of bytes, said bytes including at least one enhanced DMX slave instruction byte corresponding to an enhanced DMX slave and at least one forward error correction byte;

wherein said forward error correction byte is incorporated within said DMX packet and is a forward error correction code block of a plurality of said bytes of said DMX packet;

buffering a plurality of said bytes including said forward error correction byte;

analyzing at least one of said enhanced DMX slave instruction bytes in light of said forward error correction byte at each of said enhanced DMX slaves;

at least selectively correcting at least one of said enhanced DMX slave instruction bytes utilizing said forward error correction byte when said forward error correction byte indicates an error therewith; and at least selectively acting upon said corrected enhanced DMX slave instruction bytes.

19. The method of claim 18, wherein said at least one enhanced DMX slave instruction byte includes an interleaved first enhanced DMX slave instruction byte and an interleaved second enhanced DMX slave instruction byte and wherein the method further comprises de-interleaving said first enhanced DMX slave instruction byte and said second enhanced DMX slave instruction byte.

20. A method of providing improved DMX communication, comprising:

compiling a DMX packet having a plurality of bytes, said bytes including at least one enhanced DMX slave instruction byte corresponding to an enhanced DMX slave control address, at least one non-enhanced DMX slave instruction byte corresponding to a non-enhanced DMX slave control address, and at least one forward error correction byte;

wherein said forward error correction byte is incorporated within said DMX packet and is a forward error correction code block of a plurality of said bytes of said DMX packet; and transmitting said DMX packet on a DMX network.

21. A method of providing improved DMX communication, comprising:

compiling a DMX packet having a plurality of bytes, said bytes including a plurality of DMX slave instruction bytes and at least one forward error correction byte;

wherein said forward error correction byte is incorporated within said DMX packet and is a forward error correction code block of a plurality of said bytes of said DMX packet; and transmitting said DMX packet on a DMX network.

* * * * *